(12) United States Patent
Esposito

(10) Patent No.: US 8,573,241 B2
(45) Date of Patent: Nov. 5, 2013

(54) SYSTEMS AND PROCESSES FOR FIELD-INITIATED FLUID REGULATION TESTING

(75) Inventor: Sandro Esposito, Bridgewater, MA (US)

(73) Assignee: Dresser, Inc., Addison, TX (US)

(\*) Notice: Subject to any disclaimer, the term of this patent is extended or adjusted under 35 U.S.C. 154(b) by 847 days.

(21) Appl. No.: 11/694,565

(22) Filed: Mar. 30, 2007

(65) Prior Publication Data
US 2008/0236679 A1 Oct. 2, 2008

(51) Int. Cl.
*F16K 31/12* (2006.01)

(52) U.S. Cl.
USPC ........... 137/14; 137/487.5; 73/1.72; 702/114; 702/183; 251/30.01; 251/32

(58) Field of Classification Search
USPC ......... 137/487.5, 1, 12, 14; 73/1.72; 702/114, 702/183; 251/30.01, 32
See application file for complete search history.

(56) References Cited

U.S. PATENT DOCUMENTS

| | | | | |
|---|---|---|---|---|
| 5,329,956 A | * | 7/1994 | Marriott et al. | 137/15.01 |
| 5,469,737 A | * | 11/1995 | Smith et al. | 73/168 |
| 5,594,175 A | * | 1/1997 | Lyon et al. | 73/593 |
| 5,715,178 A | * | 2/1998 | Scarola et al. | 702/116 |
| 5,892,690 A | * | 4/1999 | Boatman et al. | 700/276 |
| 5,992,229 A | * | 11/1999 | Pyotsia et al. | 73/168 |
| 6,112,638 A | * | 9/2000 | Loechner | 91/363 A |
| 6,176,247 B1 | * | 1/2001 | Winchcomb et al. | 137/14 |
| 6,186,167 B1 | | 2/2001 | Grumstrup et al. | |
| 6,192,321 B1 | * | 2/2001 | Grumstrup et al. | 702/113 |
| 6,272,401 B1 | * | 8/2001 | Boger et al. | 700/282 |
| 6,435,022 B1 | | 8/2002 | Albuaijan | |
| 6,453,261 B2 | * | 9/2002 | Boger et al. | 702/138 |
| 6,505,145 B1 | * | 1/2003 | Bjornson | 702/185 |

(Continued)

FOREIGN PATENT DOCUMENTS

| | | |
|---|---|---|
| EP | 0 503 894 A | 9/1992 |
| WO | WO 99/04616 A | 2/1999 |
| WO | WO 02/082193 A | 10/2002 |

OTHER PUBLICATIONS

Neles ValvGaurd™—partial stroke testing system for emergency valves. [online]. Metso Automation, 2005 [retrieved on Mar. 30, 2007]. Retrieved from the Internet: <URL: http://www.metsoautomation.com/Automation/valve_prod.nsf/PrintView/89817f802f1a86C8C2256 F520035CE9E?OpenDocument>. (1 page).

(Continued)

*Primary Examiner* — William McCalister
(74) *Attorney, Agent, or Firm* — Hiscock & Barclay LLP

(57) ABSTRACT

Systems and processes may provide field-initiated testing and/or control of fluid regulatory systems. In one aspect, a fluid regulatory testing system may include a field test initiator and a fluid regulator control system. The field test initiator may alter control signal delivered to the fluid regulator control system upon activation of a user input device. The fluid regulator control system may receive control signals from the field test initiator and generate fluid regulator control signals. The fluid regulator control system may also detect whether a control signal has been altered, and initiate a fluid regulator testing sequence, if the control signal has been altered. The fluid regulator control system may include a latch mode. When a latch mode is commenced, generation of fluid regulator control signals based on received control signals and/or alteration of a position of a fluid regulator may be inhibited.

7 Claims, 9 Drawing Sheets

(56) References Cited

U.S. PATENT DOCUMENTS

| | | | |
|---|---|---|---|
| 6,631,882 B2 | 10/2003 | Mack | |
| 6,745,084 B2 * | 6/2004 | Boger et al. | 700/13 |
| 6,862,547 B2 * | 3/2005 | Snowbarger et al. | 702/114 |
| 6,920,409 B2 | 7/2005 | Essam | |
| 7,079,021 B2 | 7/2006 | Snowbarger et al. | |
| 7,150,286 B2 * | 12/2006 | Apostolides | 137/14 |
| 7,313,497 B2 * | 12/2007 | Breen et al. | 702/114 |
| 7,464,721 B2 * | 12/2008 | Perry et al. | 137/14 |
| 7,584,643 B2 * | 9/2009 | Hoffman | 73/1.72 |
| 2004/0149947 A1 | 8/2004 | Grill | |
| 2005/0109395 A1 | 5/2005 | Seberger | |
| 2006/0219299 A1 | 10/2006 | Snowbarger | |
| 2006/0220844 A1 | 10/2006 | Flanders | |
| 2007/0018127 A1 | 1/2007 | Seberger | |
| 2010/0037960 A1 * | 2/2010 | Snowbarger | 137/14 |

OTHER PUBLICATIONS

Nels FieldCare—Device and Asset Management Software Based on Open FDT/DTM Technology. [online] Metso Automation, Oct. 2006. [retrieved on Mar. 30, 2007]. Retrieved from the Internet: <URL: http://www.mediaviisi.fi/metsoautomation/neles/TechnicalBulletins/en/9FC20EN.pdf > (6 pages).

Neles ValvGaurd system, Intrinsically Safe Construction VG800X [online] Metso Automation, Oct. 2006. [retrieved on Mar. 30, 2007]. Retrieved from the Internet: <URL: http://www.mediaviisi.fi/metsoautomation/neles/TechnicalBulletinsien/9VG20EN.pdf> (6 pages).

FIELDVUE® DVC6000 Series Digital Valve Controllers for Safety Instrumented System (SIS) Solutions [online]. Emerson Process Management, Sep. 2006. [retrieved on Mar. 30, 2007]. Retrieved from the Internet: <URL: http://www.documentation.emersonprocess.com/groups/public/documents/bulletins/d102784x012h. html> (24 pages).

International Search Report and Written Opinion for PCT/US2008/058243, May 27, 2009. (17 pages).

Notification of Transmittal of the International Preliminary Report on Patentability (1 page) and International Preliminary Report on Patentability (13 pages), mailed Nov. 12, 2009 for International Application No. PCT/US2008/058243.

* cited by examiner

SYSTEMS AND PROCESSES FOR FIELD-INITIATED FLUID REGULATION TESTING

TECHNICAL FIELD

This invention relates to regulating fluid flow, and more particularly to initiating testing of fluid regulation in the field.

BACKGROUND

Control valves are used to regulate fluid flow in a wide variety of commercial and industrial systems. Today, many control valves include and/or are controlled by automated positioners, which have the ability to adjust a valve to control fluid flow for a process. Some industrial and commercial applications, such as certain chemical applications, require use of safety control valves. Since safety control valves may not be used for long periods of time, safety control valves may be periodically tested to verify operation. For example, partial or full stroke tests of the safety control valve may be performed.

Stroke tests may be performed by programming a controller of an automated positioner to stroke the valve and monitor the movement. This capability may be built into an automated positioner or retrofitted (e.g., by software update). The control signal for initiating a stroke test may come from a central control facility or a user input device of the automated positioner, which may be mechanically installed in the automated positioner as a retrofit installation.

SUMMARY

Systems and processes for fluid regulation may allow field initiated testing and fluid control. For example, operators may utilize the fluid regulatory testing system to initiate, in the field, a fluid regulator testing sequence (e.g., partial or full stroke test) to determine a fluid regulator health. As another example, operators may utilize the fluid regulatory testing system to initiate a shut-down procedure (e.g., emergency or non-emergency) where a fluid regulator position is adjusted to a safe mode position (e.g., opened or closed depending on the application). In addition, a latch mode of a fluid regulatory system may be commenced to inhibit generation of fluid regulator control signals based on received control signals and/or alteration of a position of a fluid regulator.

In one general aspect, a system for fluid regulation may include a fluid regulator control system coupled to a field test initiator. The field test initiator may receive control signals for a fluid regulator control system and convey the control signals to the fluid regulator control system. The field test initiator may also alter the control signal conveyed to the fluid regulator control system when activation of a user-input device of the field test initiator is detected. A fluid regulator control system may receive control signals from the field test initiator and generate fluid regulator control signals and determine whether to initiate a fluid regulator testing sequence based on the received control signal.

Various implementations may also include one or more of the following. A control signal may be a current signal. A field test initiator may, when activation of a user-input device is detected, alter the control signal delivered to the fluid regulator control system by between approximately 2 mA and approximately 4 mA. The field test initiator may include at least one user-input device that, when activated, activates a portion of a control signal modifier of the field test initiator. The control signal modifier may alter the control signal by a predetermined amount or to a predetermined signal. The predetermined signal may correspond to a signal for positioning the fluid regulator in a safe mode position. The fluid regulator control system may include a controller that may initiate a partial stroke test, when the control signal has been altered (e.g., by or to a predetermined amount).

In one general aspect, a process for fluid regulation may include receiving a control signal for a fluid regulator control system at a field test initiator, conveying the control signal from the field test initiator to the fluid regulator control system, altering the control signal via the field test initiator when activation of a user-input device of the field test initiator is detected, receiving the control signal from the field test initiator at the fluid regulator control system, and determining whether to initiate a fluid regulator testing sequence based on the control signals. Fluid regulator control signals may be generated based on the control signal by the fluid regulator control system.

Various implementations may include one or more of the following. Initiating a fluid regulator testing sequence may include detecting whether the control signal has been altered; and initiating a partial stroke test of a fluid regulator, if the control signal has been altered. Initiating a fluid regulator testing sequence may also include altering a position of a fluid regulator coupled to the fluid regulator control system, monitoring components of the fluid regulator control system, and determining a health of the fluid regulator control system based on the monitoring. In some implementations, activation of a user-input device may be detected and a portion of a control signal modifier of the field test initiator may be activated, upon activation of the user-input device. The control signal received by the fluid regulator control system may be a predetermined signal, corresponding to a signal for positioning a fluid regulator in a safe mode position. A fluid regulator testing sequence may be terminated in response to the received predetermined signal and the fluid regulator may be positioned in a safe mode position. In some implementations, a status signal may be sent from the fluid regulator control system to the field test initiator that is related to the fluid regulator testing sequence. An illumination of one or more indicators on the field test initiator may be altered based on the status signal. Illumination of an indicator may be related to fluid regulator testing sequence.

In another general aspect, a process for fluid regulation may include receiving a control signal for a fluid regulator control system at a field testing initiator; conveying the control signal from the field test initiator to the fluid regulator control system; altering the control signal at the field testing initiator when activation of a user-input device of the field test initiator is detected; determining if the control signal satisfies first operational criteria or second operational criteria; generating a fluid regulator control signal to adjust a position of a fluid regulator to a safe mode, if the conveyed control signal satisfies the first operational criteria; and initiating a fluid regulator testing sequence, if the transmitted control signal satisfies the second operational criteria.

Various implementations may include one or more of the following. The first operational criteria may include whether the control signal is in a predetermined range. The second operational criteria may include whether the control signal has been adjusted by a predetermined amount and/or whether the control signal is within a predetermined range for at least a predetermined period of time. The controller of the fluid regulator control system may determine if the control signal satisfies the first operational criteria or the second operational criteria. A control signal modifier of the field test initiator may detect if the control signal satisfies the first operational criteria and alter the control signal if, activation of a user-input device is detected and the control signal satisfies the first operational criteria. In some implementations, a determination may be made whether the conveyed control signal comprises a predetermined signal corresponding to a signal for positioning a fluid regulator in a safe mode position. Initiating a fluid regulator testing sequence may include monitoring components of the fluid regulator control system and determining the health of the fluid regulator control system based on the monitoring. A fluid regulator testing sequence may be interrupted if the control signal is a predetermined signal that corresponds to a signal for positioning a fluid regulator in a safe mode position.

In another general aspect, a system for fluid regulation may include a field test initiator that initiates a fluid regulator testing sequence. The field test initiator may include a first wire loop coupler that receives a control signal for a fluid regulator control system, a control signal modifier, and one or more user-input devices. The control signal modifier may alter the control signal to indicate that a fluid regulator testing sequence should be performed. The user-input devices may activate a portion of the control signal modifier upon activation.

Various implementations may include one or more of the following. The control signal modifier may alter the control signal by a predetermined amount or to a predetermined signal that corresponds to a signal for positioning a fluid regulator in a safe mode position. The control signal modifier may be a passive device and/or include passive electronic components, such as shunts. A control signal may be altered via the shunts when the control signal satisfies specified operational criteria. In some implementations, when the value of the control signal is less than a specified value, the control signal modifier may determine a value of the received control signal and convey the received control signal without significant alteration. The control signal may be a current signal and the control signal modifier may alter the control signal by between approximately 2 mA and approximately 4 mA when at least one of the user-input devices is activated. The field test initiator may include indicators that provide a visual signal related to the fluid regulator testing sequence.

In another general aspect, a system for fluid regulation may include a fluid regulator control system that includes an electric-to-pressure converter and a controller. The controller may receive control signals and generate fluid regulator control signals for the electric-to-pressure converter based on the received control signals. The controller may also commence a latch mode and determine if an unlatch signal has been detected. The controller may inhibit generation of the fluid regulator control signals based on the received control signals, if the latch mode has been commenced and the unlatch signal has not been detected. The controller may also reinitiate generation of the fluid regulator control signals based on the received control signals, if the unlatch signal has been detected.

Various implementations may include one or more of the following. The controller may commence a latch mode when the received control signals indicate that a fluid regulator should be transitioned to in a predetermined position. The latch mode may be associated with a safe mode position of a fluid regulator. The controller may detect the unlatch signal when a short circuit is detected and/or when a voltage interrupt is received. The system may also include a user-input device coupled to the fluid regulator control system and electrically coupled to the fluid regulator control system, wherein activation of the user-input device conveys the unlatch signal to the controller. The system may include a field test initiator coupled to the fluid regulatory control system. The field test initiator may include a user-input device electrically coupled to the controller, where activation of the user-input device conveys the unlatch signal to the controller. The field test initiator also may include other user-input devices. The field test initiator may receive the control signals for the fluid regulator control system, convey the received control signals to the fluid regulator control system, and alter the control signals conveyed to the fluid regulator control system upon detection of activation of at least one of the other user-input devices of the field test initiator. The received control signals for the fluid regulator control system may be altered, when at least one of the other user-input devices is activated, to indicate to the controller that a fluid regulator testing sequence should be performed and/or to indicate to the controller that a fluid regulator control signal should be generated to position the fluid regulator in a safe mode. The field test initiator may be coupled to the fluid regulator control system such that the field test initiator is in a communication circuit of the fluid regulator control system.

In one general aspect, a process for fluid regulation at a fluid regulator control system may include receiving control signals, generating fluid regulator control signals for an electric-to-pressure converter of the fluid regulator control system based on the received control signals, commencing a latch mode, and determining if an unlatch signal is detected. The process may inhibit generation of fluid regulator control signals based on the received control signal, if the latch mode has been commenced and the unlatch signal has not been detected. The process may also reinitiate generation of fluid regulator control signals based on the received control signal, if the unlatch signal has been detected.

Various implementations may include one or more of the following. A latch mode of the fluid regulator control system may be commenced when the received control signals indicate that a fluid regulator should be transitioned to in a predetermined position. Detecting the unlatch signal may include detecting an interrupt. Activation of a user-input device coupled to the fluid regulator control system may be detected. Activation of a user-input device may generate the unlatch signal. A fluid regulator testing sequence may be initiated when received control signals indicate a fluid regulation testing sequence should be performed, if the fluid regulator control system is not in a latch mode.

Various implementations may have one or more features. One feature of a fluid regulatory testing system with a communication circuit field test initiator may be the ease of use, which may increase the likelihood of testing and, hence, increase safety. For example, since user-input devices of the field test initiator may be used to initiate testing while the operator is in the field, an operator may initiate testing while observing the fluid regulator rather than having to return to a central control facility, where the operator may forget to initiate the test. Allowing field-initiated fluid regulator testing sequence also allows an operator to observe the fluid regulator during the testing sequence, as opposed to currently used systems that require an operator to initiate testing sequences in the central control facility. In addition, if a problem is observed with fluid regulator operations, or near-by processes that affect the fluid regulator, the fluid regulator may be immediately positioned in a safe mode position from the field. Thus, the quicker shut down may be initiated, the more safety may be increased and production costs decreased, since the process may be less out of control and less undesirable product may be produced. Another feature of a communication circuit field test initiator includes ease of installation since the field test initiator may be coupled between a central command facility and the fluid regulator control system via the communication circuit. In addition, use of a communication circuit field test initiator may facilitate retrofitting currently used fluid regulator control systems, since the field test initiator may be coupled external to the fluid regulator control system via the communication circuit. Another feature of the communication circuit field test initiator may include the ability to modify the control signal without an additional power supply. For example, if the field test initiator is a passive device, the field test initiator may not require a separate power supply.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Systems and processes for the regulation of fluids (e.g., gasses, liquids, or combinations thereof) may often maintain a fluid regulator position for a long period of time. Thus, the reliability of the ability of the fluid regulatory testing systems to operate and/or position a fluid regulator in a safe mode position (e.g., during emergency shut-downs or while moving a process off-line, such as for maintenance or other reasons) may need to be tested. A testing sequence and/or an emergency shut down may be initiated in the field via the fluid regulatory testing system. A fluid regulatory testing system may include a field test initiator and a fluid regulatory control system operable on a fluid regulatory. The field test initiator in communication with the fluid regulatory control system may allow field initiated testing of the fluid regulator.

Figure 1:
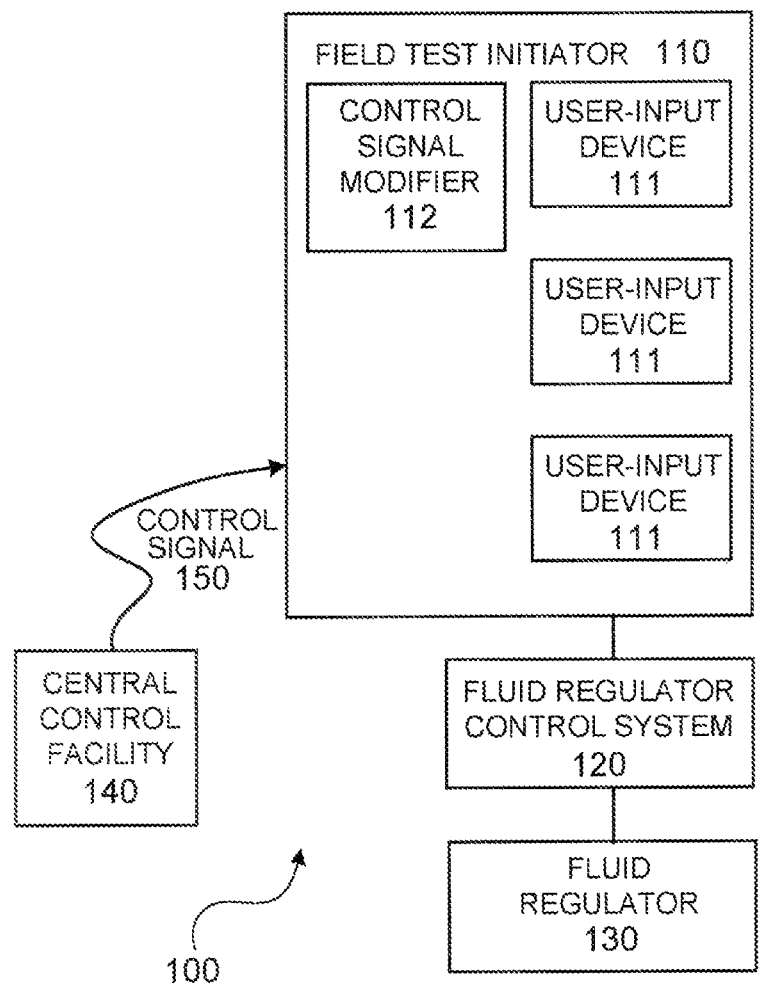
FIG. 1 is a block diagram illustrating an example of a fluid regulatory testing system.

FIG. 1 illustrates a block diagram of an example fluid regulatory testing system 100. The fluid regulatory testing system 100 includes a field test initiator 110 coupled to a fluid regulator control system 120 (e.g., valve positioning system, such as a system including a controller and a converter) that operates and/or controls a fluid regulator 130 (e.g., a valve, such as a ball valve, a globe valve, or any other type of fluid affecting device). A central control facility 140 may generate control signal 150 for fluid regulator control system 120. Central control facility 140 (e.g., a control office remotely located from the fluid regulator) may monitor and/or transmit control signals 150 to more than one fluid regulator 130 and/or fluid regulator control systems 120.

In the illustrated implementations, control signal 150 is conveyed to field test initiator 110 from the central control facility 140. Field test initiator 110 receives control signal 150 and may alter the control signal prior to conveying the control signal to the fluid regulator control system 120. As illustrated in FIG. 1, field test initiator 110 may include three user-input devices 111, such as field push-pull buttons, keypads, or rotary switches. User-input device 111 may be activated in the field by, for example, an operator depressing a button or turning a knob. Activation of user-input device 111 may activate a portion of the control signal modifier 112 of the field test initiator 1110.

Control signal modifier 112 may modify control signal 150 when a user-input device 111 is activated. For example, activation of one of the user-input devices 111 may direct control signal 150 to control signal modifier 112, where the control signal is altered by a predetermined amount (e.g., between approximately 2 mA and 4 mA or between approximately 3 mA and approximately 5 mA). As another example, activation of another user-input device 111 may activate a portion of control signal modifier 112 where the control signal is altered to a predetermined amount (e.g., 0 mA or 4 mA). In, for example, a current loop (e.g., 4-20 mA), the control signal modifier 112 may reduce the current of the control signal.

After passing through field test initiator 110, the control signal 150 (e.g., altered control signal or unaltered control signal) may be conveyed to the fluid regulator control system 120. Fluid regulator control system 120 may determine whether to initiate a fluid regulator testing sequence (e.g., a stroke test) based on the conveyed control signal 150 and generates a fluid regulator control signal 150 based on the conveyed control signal 150. For example, if the control signal 150 has been altered, fluid regulator control system may generate a fluid regulator control signal to initiate a fluid regulator testing sequence or to adjust a position of a fluid regulator 130 to a safe mode position, as appropriate. As another example, if the control signal 150 has not been altered by field test initiator 110, the fluid regulator control signal may continue operations based on the control signal.

Initiating testing in the field (e.g., proximate the fluid regulator) may allow operators visually inspecting the fluid regulator control system and/or the fluid regulator and initiate testing without returning to a central control center. Additionally, allowing emergency shut-down in the field may allow operators in the field who observe abnormalities in operation, dangerous conditions, or the like to initiate shut-down (e.g., venting of fluids, restricting fluid flow, etc.) more quickly. Thus, safety may be increased since, for example, decreasing the amount of time in which a process is out of control during an emergency shut down decreases costs due to the production of undesirable products and/or reduces damage caused by out of control processes.

In various implementations, the control signal modifier may include combinations of electrical components, such as resistors, capacitors, diodes, shunts, etc. For example, a control signal modifier may include one or more shunts. The control signal may be altered by the shunt when it meets operational criteria (e.g., above or below a predetermined range). In some implementations, control signal modifier 112 may be a passive device (e.g., a device that has zero or an insignificant amplification or power gain within the device). Utilizing a passive control signal modifier in the field test initiator may allow the control signal modifier to be operable without an additional power source (e.g., the field test initiator may operate on the power from the control signal). Features of field test initiators that do not require additional power to alter control signals, may include increased durability, since there are fewer parts to malfunction, and increase revenue during use due to decreased power consumption.

Figure 2:
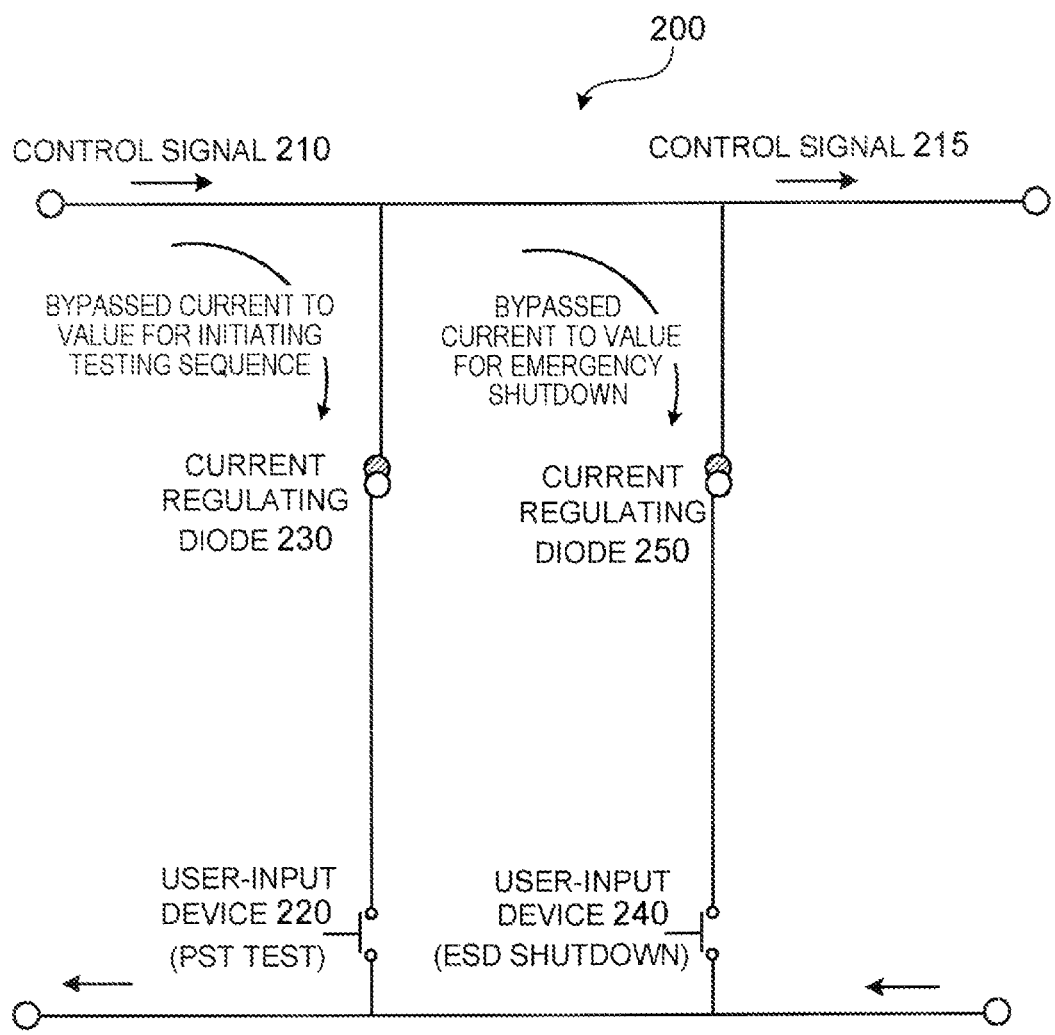
FIG. 2 is an electronic schematic of an example field test initiator.

FIG. 2 illustrates an electrical schematic of an example field test initiator 200 for use in a communication circuit (e.g., a two-wire loop). The field test initiator 200 alters a control signal 210 by regulating current flow. Field test initiator 200 includes user-input devices 220, 240 to initiate a test and initiate an energy shut down, for example. As illustrated in FIG. 2, field test initiator 200 may include a first user-input device 220 in electrical communication with a first diode 230 (e.g., 1N5283 diode). Activation of first user-input device 210 may cause a predetermined amount of control signal 210 to be bled to the ground line. Thus, the control signal is conveyed from field test initiator 200 as an altered control signal 215 that has a value less than control signal 210. Field test initiator 200 also includes a second user-input device 240 in electrical communication with a second diode 250. Activation of second user-input device 240 may also cause a predetermined amount of control signal 210 to be bled to the ground line. Thus, control signal 215 is also conveyed from field test initiator as an altered control signal that has a lower value than control signal 210.

In one implementation, first diode 230 may be an approximately 4 mA current regulating diode and second diode 250 may be an approximately 16 mA current regulating diode. A 20 mA control signal may be transmitted from the central control facility to the field test initiator 200 to hold a fluid regulator in an open position, for example. When none of the user-input devices are activated, the control signal 210 is allowed to pass through the field test initiator without substantially inhibition. Thus, the control signal 215 leaving the field test initiator 200 may not be substantially altered (e.g., control signal 215 has substantially the same value as the control signal 210 entering the field test initiator and/or control signal 215 has a value within approximately 100 µA of the control signal entering the field test initiator). When first user-input device 220 is activated, the first diode 230 allows approximately 4 mA of control signal 210 to pass to the ground line, and thus the value of the current of the altered control signal 215 may be approximately 16 mA. The 16 mA current signal may indicate to a fluid regulator control system that a fluid regulator testing sequence (e.g., partial stroke test, full stroke test, etc.) should be performed. When second user-input device 250 is activated, the second diode 240 allows approximately 16 mA of control signal 210 to pass to the ground line, and thus the resulting altered control signal 215 may have a current of approximately 4 mA. The 4 mA current signal may indicate to a fluid regulator control system that the fluid regulator should be positioned in a safe mode position (e.g., to allow gasses to vent or to inhibit fluid flow).

Although the above electrical schematic of a field test initiator only depicts two switches and two diodes, any number of switches and/or diodes may be used. For example, the field test initiator may include an additional switch and an additional diode that alters the control signal to a predetermined value that may indicate to the fluid regulator control system that a full stroke test or other fluid regulator testing sequence should be performed. Although a passive control signal modifier is described, an electrically active control signal modifier may be designed, and, for example, electrical components that increase the value of the control signal to or by a predetermined amount may be used. In addition, although the illustrated user-input device is depicted as including an electrical switch that acts with the control signal modifier, the electrical switch may be a portion of the control signal modifier and the electrical switch may detect activation of the user-input device and activate accordingly.

Figure 3:
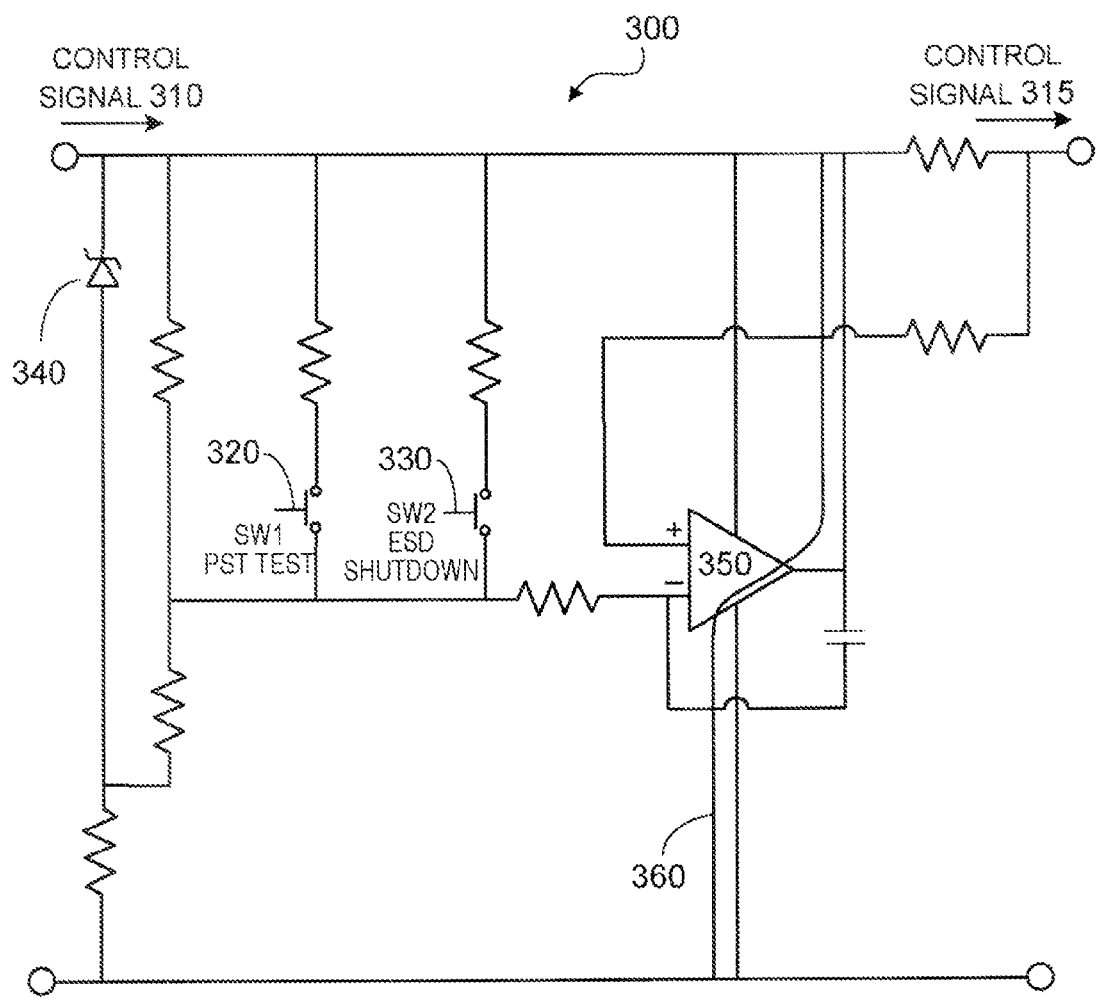
FIG. 3 is an electronic schematic of another example field test initiator.

FIG. 3 illustrates an electrical schematic of another example field test initiator 300. The field test initiator 300 may alter a control signal 310 based on the value of the control signal received. As illustrated, field test initiator 300 includes a first switch 320, a second switch 330, and a combination of resistors, diodes, capacitors, and op-amps (operational amplifiers). First switch 320 and second switch 330 may be coupled to user-input devices, such that when a user-input device is activated, the first and/or second switch is closed. Activation of first switch 320 or second switch 330 affects the control signal 310 in field test initiator 300.

As illustrated, when none of the switches are activated, a portion of the control signal 310 enters a diode 340 (e.g., zener gap diode) that allows a fixed voltage signal to pass through. The fixed voltage signal passes through resistors and into the negative leg of the op-amp 350. The other portion of the control signal 310 passes through resistors prior to entering the positive leg of the op-amp 350. In op-amp 350, the signals in the positive and negative legs are compared. If the signal in the negative leg has a greater voltage than the signal in the positive leg, then current from the positive leg is drained (e.g., down to the negative leg, see path 360, by sinking current to the ground, etc.) until the voltages are approximately equal. If the signal in the negative leg has a voltage that is less than the voltage of the signal in the positive leg, the op-amp does not alter the signal in the positive leg. If the voltages of the signals in the negative and positive legs are approximately equal, the op-amp does not alter the signal in the positive leg. Thus, in the case where neither switch is activated, the circuit may be designed so that the voltages in the positive and negative legs are approximately equal, the control signal 315 conveyed from the field test initiator 300 is approximately the same as the received control signal 310.

When the first switch 320 is activated, however, the field test initiator alters the control signal. As illustrated, a portion of the control signal passes through another resistor prior to entering the negative leg of the op-amp. The field test initiator may be designed such that, when a 20 mA control signal is received and the first switch is activated, the resulting voltage of the signal in the negative-leg is greater than the voltage of the signal in the positive leg. The op-amp 350 then bleeds current from the positive leg to the ground until the voltage difference between the positive and negative legs is insignificant. The feedback leg from the op-amp passes though a capacitor and additional resistor to reduce noise (e.g., inhibit oscillation with the incoming current from the process controller).

When the second switch 330 is activated, the field test initiator alters the control signal. A portion of the control signal 310 passes through an additional resistor prior to entering the negative leg of the op-amp 350. The additional resistor that the control signal passes through when the second switch 350 is activated may be different from the additional resistor that the control signal passes through when the first switch 330 is activated. Using different resistors may result in different voltages at the negative leg of the op-amp, and thus, different altered control signals leaving the field test initiator. The voltage at the negative leg of op-amp 350 is compared to the voltage of the signal in the positive leg; and, if the voltage of signal in the negative leg is higher than the voltage of the signal in the positive leg, current from the signal in the positive leg is bled to the ground line until the voltages are approximately the same. Thus, the current for the control signal 315 conveyed from the field test initiator is less than the current for the control signal 310 received by the field test initiator.

If an 18 mA control signal control signal enters the field test initiator, as described above, the field test initiator may be designed such that the resulting voltage entering the negative leg of the op-amp is greater than the voltage of the signal in the positive leg, and the op-amp 350 may bleed current from the signal in the positive leg until the voltage difference is insignificant. The resulting altered control may be 16 mA. Thus, the field test initiator may alter the control signal when a switch is activated by an amount related to the received control signal and/or a predetermined amount of control signal may be sent to the fluid regulator control system when a user-input device is activated.

Furthermore, the field test initiator may not alter the control signal if it does not satisfy operational criteria (e.g., if the value of the control signal is less than a specified value). For example, if a control signal of 16 mA enters the field test initiator, as described above, the field test initiator may be designed such that the resulting voltage entering the negative leg of the op-amp is approximately the same as or greater than the voltage of the signal in the positive leg, and the control signal 315 conveyed from the field test initiator will be approximately the same as the received control signal 310. A field test initiator may not alter signals below a specified value to inhibit the fluid regulator control system from interpreting the altered signal as a signal to position a fluid regulator in a safe mode position rather than a signal to initiate a fluid regulator testing sequence, for example. Additionally, a field test initiator may not alter signals that do not meet operational criteria (e.g., below a specified value) to inhibit the fluid regulator control system from initiating a fluid regulator testing sequence while the fluid regulator is in a safe mode position and/or while testing (e.g., initiated by the central control facility) is in progress.

Figure 4:
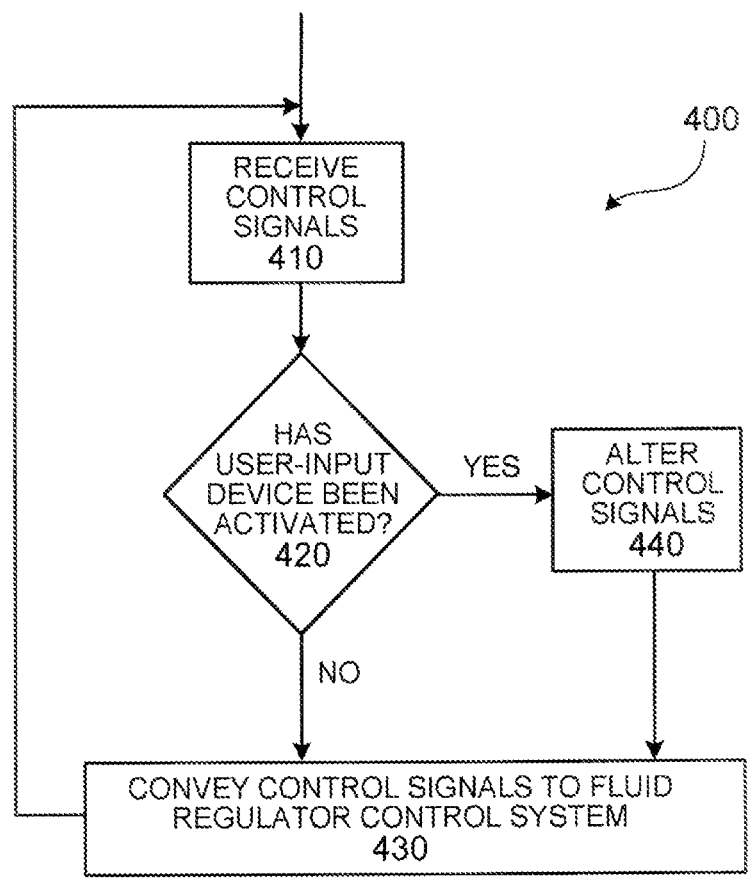
FIG. 4 is a flow chart illustrating an example process performed by a fluid regulatory testing system.

FIG. 4 illustrates an example process 400 for fluid regulation field testing. Process 400 begins with receiving a control signal (operation 410). For example, a control signal for a fluid regulator control system may be transmitted by a central control facility and received by the field test initiator. The control signal may be, for example, a current signal (e.g., 4 to 20 mA control loop), a voltage signal, and/or a frequency signal. In addition, although the switches are described as a portion of the control signal modifier, the switches may be a portion of the user-input devices.

Whether one or more user-input devices have been activated may be detected (operation 420). For example, a user-input device may be coupled to an electrical switch or may include an electrical switch that activates a portion of the control signal modifier when activated.

If the user-input device has not been activated, the control signals may be conveyed to the fluid regulator control system (operation 430). For example, the unaltered or insignificantly altered control signal may be conveyed by the field test initiator to a valve positioning system.

If a user-input device has been activated, the control signal is altered (operation 440). The control signal may be altered by a portion of the field test initiator (e.g., a control signal modifier). The control signal may be altered by a predetermined amount (e.g., approximately 1 mA to approximately 5 mA, approximately 2 mA to approximately 4 mA, etc.) or may be altered to a predetermined amount (e.g., approximately 16 mA, approximately 4 mA, approximately 0 mA). The control signal may be altered by or to a predetermined amount for at least a predetermined period of time (e.g, approximately 2 seconds, approximately 3 seconds, etc.). A control signal may be altered for at least a predetermined period of time to distinguish the altered signal from fluctuations or other interruption in the control signal and/or to facilitate identification of the altered control signal by the controller. For example, a portion of the control signal may be diverted to the ground line when activation of a user-input device is detected. The control signal (e.g., altered or insignificantly altered control signal) is then conveyed to the fluid regulator control system (operation 430).

After the control system is conveyed to the fluid regulator control system (operation 430), another control signal received may be processed (operation 410). For example, since control signals may be received by the field test initiator continuous or periodically (e.g., once every second, once every three seconds, etc.), the field test initiator may convey the received control signals to the fluid regulatory control system until activation of a user-input device has been detected.

Process 400 may be implemented by system 100 or similar systems. In addition, various operations may be added, deleted, modified, or reordered in process 400. For example, a value of a control signal may be determined. As another example, the alteration to the control signal, when a user-input device is activated may be based on the user-input device activated and/or the value of the control signal received. In addition, the control signal may not be altered when the control signal is below a predetermined value.

Figure 5:
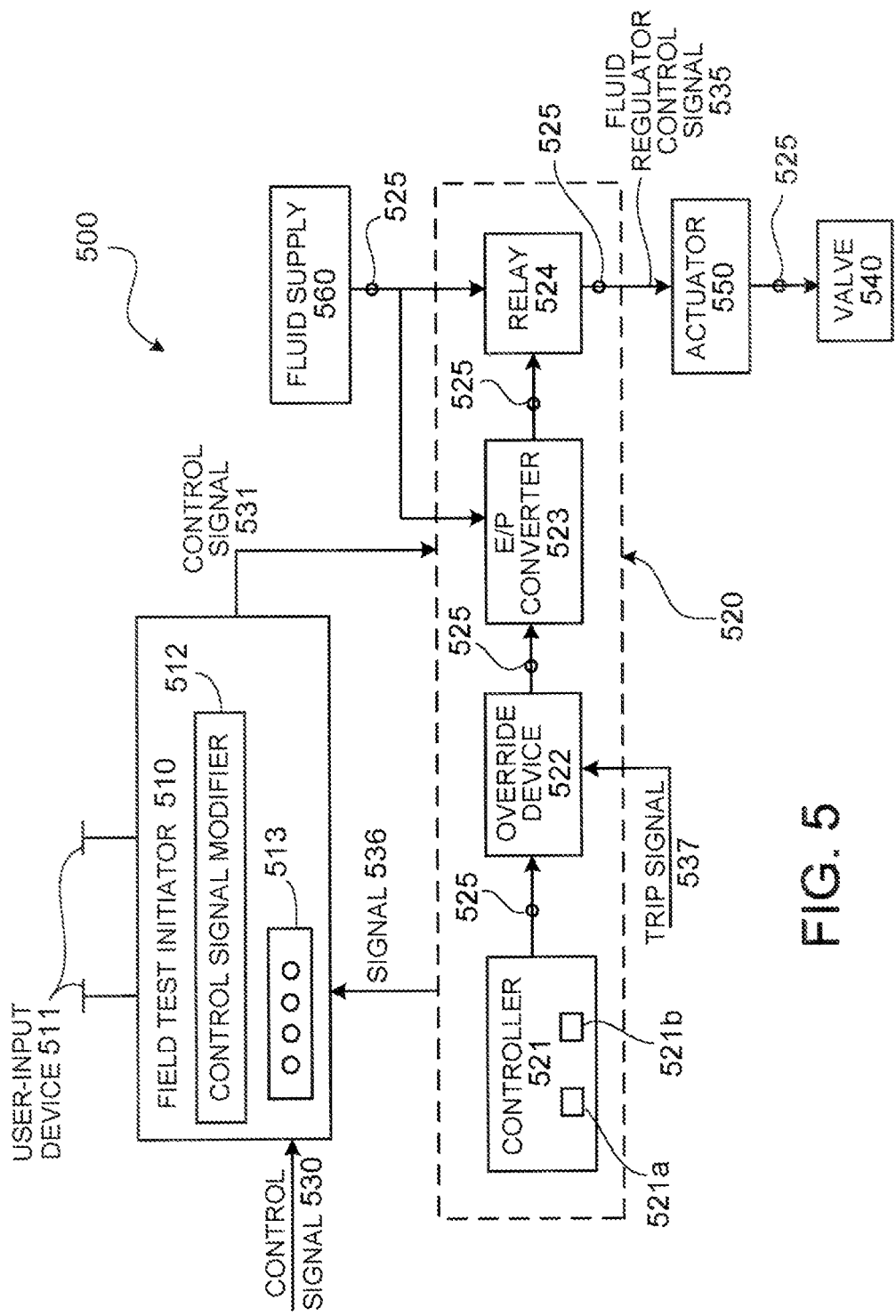
FIG. 5 is a block diagram illustrating another example of a fluid regulatory testing system.

FIG. 5 illustrates an example fluid regulatory testing system 500. Fluid regulatory testing system 500 includes a field test initiator 510 and a valve positioning system 520. A control signal 530 may be received by field test initiator 510 and conveyed to valve positioning system 520. The valve positioning system may generate a fluid regulatory control signal 535 to control a position of a valve 540.

Field test initiator 510 includes user-input devices 511 that, when activated, activate a portion of a control signal modifier 512. Activation of a portion of control signal modifier may alter the control signal (e.g., reduce the voltage, reduce the current, increase the voltage, etc.). The alteration of the control signal 530 may indicate that a fluid regulator testing sequence should be performed or that a fluid regulator (e.g., valve 540) should be positioned in a safe mode position.

The control signal modifier 512 may alter control signal 530 via one or more electrical components. The control signal modifier may be a passive or an active electrical device. The control signal modifier may alter the received control signal 530 to indicate to valve positioning system 520 that a fluid regulatory testing sequence (e.g., partial stroke test) should be initiated and/or that a fluid regulator control signal should be generated to position a valve in a safe mode position.

The field test initiator 510 may also include indicators 513 (e.g., lights, LEDs, LCD screen, etc). The indicators 513 may provide information related to a fluid regulatory testing sequence. For example, indicators 513 may indicate which fluid regulatory testing sequence is implemented by the valve positioning system (e.g., partial or full stroke test), if a user-input device was activated, whether the valve positioning system has initiated testing, whether the testing is in progress or complete, and/or the results of the fluid regulatory testing sequence (e.g., indication of valve health—poor, fair, good; where problems are identified in a valve positioning system, etc.). Field test initiator may receive signals 536 related to a fluid regulatory testing sequence via a wire coupling the field test initiator to the valve positioning system. The indicators 513 may be coupled to a power source (e.g., internal battery) that supplies power to the indicators.

The field test initiator 510 may be coupled to the valve positioning system via a two-wire loop. For example a first two-wire loop coupler (e.g., on the field test initiator) may receive control signal 530 for the valve positioning system. A second two-wire loop coupler may receive the ground signal from the valve positioning system. Using a two-wire loop configuration may simplify installation of the field test initiator to existing and/or new valve positioning systems, decrease production costs, and/or reduce interference.

Valve positioning system may receive control signal 531 from field test initiator 510 and send a fluid regulatory control signal 535 to an actuator 550, which adjusts a position of the valve 540 based on the fluid regulatory control signal 535. The valve positioning system 520 may include components such as a controller 521, an electric to pressure converter (E/P converter) 523, and a relay 524. Signal 535 may be transformed and modified by various components (e.g., E/P converter, relay, etc.) of the valve positioning system 520 and delivered to actuator 550 (e.g., a piston subject to differential pressure) which operates on the valve 540.

The controller 521 may include a programmable logic device 521a, such as a microprocessor, a microcontroller, a field programmable gate array (FPGA), a non-programmable logic device, such as an application specific integrated circuit (ASIC), or any other device for manipulating information in a logical manner. Additionally, controller 521 may include a memory 521b to store data and/or instructions. Memory 521b of controller 521 may include volatile or nonvolatile memory such as, RAM, ROM, optical memory, magnetic memory, flash memory, electrically-erasable, programmable ROM (EEPROM), phase-change RAM (PRAM), ferroelectric RAM (FeRAM), or any other appropriate device for storing information. At least a portion of memory 521b may be nonvolatile so that power interruptions do not affect the storage of data. Controller 521 may be operable in, for example, a current or voltage range (e.g., approximately 4 to approximately 20 mA, approximately 1 to approximately 24 volts, approximately 12 to approximately 24 volts, etc.).

Controller 521 may receive control signal 531 and generate a signal to the E/P converter 523 based the received control signal. Controller 521 may determine whether to initiate a fluid regulatory testing sequence based on control signal 531. For example, controller 521 may determine whether the control signal 531 indicates that an operation is to be performed (e.g., initiate fluid regulatory testing sequence or generate fluid regulator control signals to position a fluid regulator in a safe mode position). The controller 521 may compare the received control signal to previous control signals to determined if the control signal has been adjusted. Controller 521 may detect (e.g., via electronic circuitry) whether the control signal has been adjusted. If the control signal has been adjusted, the controller may initiate a response. For example, the controller may initiate a fluid regulatory testing sequence or generating a fluid regulatory control signal that indicates that a position of a valve should be a safe mode position.

Controller 521 may also detect a level of a control signal and initiate a response based on the control signal. For example, in a 4-20 mA current loop, the controller may initiate a fluid regulatory testing sequence when a control signal is a first predetermined amount, open a valve when a control signal is a second predetermined amount, and close a valve when the control signal is a third predetermined amount. Predetermined ranges (e.g., ±1 mA) may be used rather than predetermined amounts to indicate which action a controller should take.

In some implementations, controller 521 may determine if received control signal 531 satisfies one or more operational criteria. For example, if the control signal satisfies a first operational criteria (e.g., below a specified value), the controller may generate a fluid regulatory control signal that indicates a valve should be adjusted to a safe mode position. If the control valve satisfies another operational criteria (e.g., in a specified range of values), a testing sequence may be initiated by the controller.

E/P converter 523 of valve positioning system 520 converts an electrical signal from controller 521 to a pressure signal of fluid or gas (e.g., air, natural gas, or other appropriate compressible gasses). Although an E/P converter is described, other appropriate converters capable of converting signals received from the controller may be used. Relay 524 may then amplify signals received (e.g., by pressure, volume, and/or flow rate) and convey the fluid regulatory control signal 535 to the actuator 550. Relay 524 may include, but is not limited to, a spring-diaphragm actuator, a spool valve, or a pneumatic amplifier. A fluid supply 560 (e.g., air or natural gas) may supply fluid to E/P converter 523 and/or relay 524.

Valve positioning system may also include sensors 525 coupled to components and/or to connections between components. Sensors 525 may be any device capable of measuring a signal (e.g., electrical, mechanical, or fluid) or position produced and/or received by the valve positioning system. For example, a sensor may measure parameters such as, but not limited to, pressure, flow rate, electrical current, electrical voltage, and/or a valve position. Sensors 525 may transmit data from monitored components to controller 521. Data from sensors 525 may be used to determine a health of a valve and/or identify problems with one or more components of the valve.

Various analyses, such as comparing input/output curves, F-test, Fourier transforms, etc., may be performed on the data from the sensors. As another example, trending analysis may be performed on the data from monitoring components. A problem with component(s) may be diagnosed based on the data. For example, data may be analyzed to determine if friction has increased in the valve or a leak exists in a connection between components of the fluid regulatory testing system. As another example, problems such as plugging in electrical to pressure output converters, deposits on electrical to pressure output converter flexures or nozzles, failure of controller electronics, performance shift of controller electronics, failure or leak in a relay (e.g., failure or leak in a diaphragm of a relay), gas leaks in tubing connections (e.g., to an actuator, a relay, or an electrical to pressure output converter), broken actuator springs, increased packing friction, low pressure gas stream delivery from gas supply, and/or temperature outside a predetermined range (e.g., high temperatures may cause failure in a few days)) may be diagnosed.

In some implementations, valve positioning system 520 also includes an override device 522 (e.g., a safety override circuit or device). Override device 522 may provide safety control features to a fluid regulatory testing system. For example, if unsafe conditions exist in or affect the fluid regulatory testing system 500, override device 522 may modify or interrupt a signal provided to or by fluid regulatory testing system 520 to provide a signal that causes the fluid regulatory testing system to go to a "safe mode" (e.g., vent fluids to atmosphere, close valves, or any action appropriate for a specific system). As an example, if a process such as a chemical reaction becomes uncontrollable, the override device may interrupt the signal to the E/P converter 523 and cause the fluid regulatory testing system to go to a safe state (e.g., closing a feed line to the process). As another example, if a leak of unsafe material is detected, the override device may modify the signal to cause the fluid regulatory testing system to close a valve upstream of the leak.

Override device 522 may be implemented using digital components, analog components, or a combination thereof. Override device 522 may be any collection of electronic components that can interrupt or modify the communication of a signal to E/P converter 523 without disrupting the ability of the signal to power controller 521 and/or sensors 525. Override device 522 may be located apart from controller 521, such as on a separate printed circuit board, or it may be integrated with the controller.

A trip signal 537 and/or control signal 531 may control operation of override device 522. Trip signal 537 may be regulated by an external control mechanism, which may base determinations on data received from various parts of a regulation process and/or facility. Override device 522 may, for example, be triggered in response to receiving trip signal 537 (e.g., for testing purposes or to cause a fluid regulatory testing system to go to a safe state), detecting a change in the state of control signal 531 (such as rapid changes in the control signal), detecting an interruption in the trip signal or the control signal, receiving notice of an unsafe condition, or any of numerous other events which require operating fluid regulatory testing system in a safe state.

When override device 522 receives trip signal 537, the modification performed on the signal transmitted from controller 521 to E/P converter 523 may be any suitable modification to cause the E/P converter to perform an action associated with the "safe mode" (e.g., transitioning to a default state, such as closed, or freezing the current state). For example, some E/P converters 523 vent to the atmosphere (e.g., a valve is opened that releases fluids in the fluid regulatory testing system to the atmosphere) when the control signal is interrupted.

When the override device 522 is triggered based on control signal 531 (e.g., when control signal 531 rapidly changes or fluctuates), the override device modifies the signal transmitted from controller 521 to E/P converter 523 such that the E/P converter generates a signal in response that corresponds to positioning the fluid regulator (e.g., valve 540) in a safe mode. For example, the override device may modify the signal transmitted from the controller 521 to the E/P converter 523 so that a position of valve 540 is moved from closed to the safe mode position of "open" by actuator 550 in response to the fluid regulator control signal 535.

Override device 522, which may be viewed as a safety override circuit in one aspect, may have a variety of configurations. In certain implementations, for example, override device 522 may receive control signal 531 before it is provided to controller 521. Thus, override device 522 may evaluate control signal 531 and determine whether to modify the signal to E/P converter 523 while still allowing controller 521 to extract power and communications from the control signal. Modifying the signal to the E/P converter 523 may include boosting, attenuating, transforming, interrupting, converting, or otherwise manipulating the signal to produce a particular response from E/P converter. If the command signal does not indicate that a condition is occurring, the control signal output by override device 522 may be essentially the same as one that enters.

To evaluate the signal for modifying control of the E/P converter control signal, override device 522 may, for example, include a transistor coupled to the control signal line and controlled by a comparator. The transistor may be any suitable current- or voltage-controlled electronic component that restricts or allows current flow in response to a signal at a control terminal (discussed here as a comparator). For example, the transistor may be p-type or n-type field effect transistor (FET), such as metal oxide semiconductor FET (MOSFET) that is controlled by a voltage applied to a gate terminal of the MOSFET. The comparator may be any circuitry for comparing a reference input signal to a threshold input signal (e.g., an op-amp) and producing an output to control the transistor in response to the comparison.

In one implementation, override device 522 may receive an input current generated from the control signal. A resistor may be coupled to the negative line of the signal and placed in parallel with a diode to develop a voltage proportional to the signal's input current. A resistor may also be coupled to the positive line of the signal to produce a characteristic voltage drop representative of the signal's input current. A voltage regulator may work with the second resistor to form a constant reference voltage against which the voltage across the first resistor is compared.

In operation, the comparator performs the comparison of the characteristic voltage representative of the input current to the reference voltage. If the characteristic voltage falls out of range (e.g., below the reference voltage), because the input current is too low or because the voltage regulator has shunted the input current to ground because it was too high, the comparator turns off its respective transistor, thus interrupting current flow to the E/P converter. In particular implementations, the circuitry can be redundantly duplicated to provide added security.

To evaluate trip signal 537 for modifying the control signal, override device 522 may, for example, include a transistor in the positive path of the control signal. The transistor may be any suitable current- or voltage-controlled electronic component that restricts or allows current flow in response to a signal at a control terminal (discussed here as a voltage regulator). The voltage signal used to control the transistor is the trip signal, stepped down by a voltage regulator to a voltage level appropriate for the transistor. Thus, for example, a 24-V trip signal could be stepped down for 5 V if the transistor was a 5-V MOSFET. The override device may also have a resistor coupled between the positive path of the signal and the gate line of the transistor to prevent current from the stepped-down trip signal from significantly altering the signal. For example, the resistor may be selected to have a relatively high resistance value, such as 1 MΩ, to minimize current flow.

In operation, the transistor allows current flow as long as the stepped-down voltage from the trip signal is maintained. When trip signal 537 is interrupted, the current flow through the transistor is interrupted, thus interrupting the signal to the E/P converter. In response to the interruption of the signals, the E/P converter transitions to a safe state, such as venting to the atmosphere. Thus, the override device provides an effective operation for stopping the signal in response to the trip signal 537. In particular implementations, the override device 522 may include two duplicate override circuits for increased reliability.

In certain implementations, the features of monitoring the control signal and monitoring trip signal 537 may be provided in one override device 522 (e.g., on the same circuit board). In application, however, it may be that only one of the safety features is used. Furthermore, although mention has been made of the override device having redundancy through duplicate circuits, it may be advantageous to provide redundancy through non-duplicate circuits, which may reduce the chance of both circuits being affected by the same condition. In certain implementations, however, redundancy is not required.

In some implementations, control signals may be delivered to controller 521 over a wire loop (e.g., a wire pair). Utilizing one wire loop may simplify operations and/or reduce interference. Controller 521, which is powered by control signal 531, generates an appropriate signal to send to E/P converter 523 based at least partially on the control signal. The signal is then provided to override device 522, which conveys the signal to E/P converter 523. E/P converter 523 converts the electric signal to a pressure signal (e.g., fluid regulatory control signal 535) for delivery to relay 525, which may modify or maintain the pressure signal. The pressure signal is then transmitted to actuator 550, which adjusts the position of valve 540 based on the pressure signal.

During one mode of operation of the fluid regulatory testing system 500, control signal 531 is sent to override device 522 of valve positioning system 520. Override device 522 determines whether the signal to E/P converter 523 should be modified or interrupted (e.g., due to conditions that require the fluid regulatory testing system to go to a safe state). If override device 522 determines that the signal does not need to be modified or interrupted, the signal is conveyed to E/P converter 523.

If override device 522 determines that the signal should be interrupted, the signal to E/P converter 523 is terminated while power is maintained to controller 521 (e.g., by allowing control signal 531 to pass to controller 521). Termination of the signal to the E/P converter allows the fluid regulatory testing system to go to a safe mode position (e.g., close valve 540). Since power is maintained to controller 521, and/or sensors 525, if required, components of the fluid regulatory testing system may be monitored.

Override device 522 may modify or interrupt the signal to the E/P converter 523 for a variety of reasons, such as the detection of an unsafe condition in or affecting the fluid regulatory testing system. For example, if values measured by sensors 525 exceed a safe range, controller 521 may transmit a message to override device 522 indicating the unsafe conditions. As another example, if an unsafe condition is detected (e.g., out of range signals, position, temperature, reference voltage, and/or pressure values; memory faults; degradation of E/P converter; and/or degradation of relay responsiveness during one or more checks), override device 522 may interrupt the control signals output by the controller.

In some implementations, fault identification and analysis may be conducted via other communication devices such as a HART (Highway Addressable Remote Transducer) modem. Controller 521 may include a HART modem to receive messages, such as commands, communicated in the control signal 531 or other signals between components of the fluid regulatory testing system. The HART modem allows sensors, transducers, controllers, and other devices to communicate in a network over a signal range, such as a 4-20 mA current loop connection. The HART modem may modulate the signal (e.g., create a 1200 baud FSK signal) in the loop that enables communication with the controller 521. Thus, the HART modem may transmit commands to controller 521, which may store the commands in memory such as RAM, EEPROM, or flash memory.

In some implementations, the field test initiator and the valve positioning system may be at least partially disposed in separate or the same housing. The housing(s) may at least partially enclose the field test initiator and/or at least one of the components of the valve positioning system. Using a field test initiator in a separate housing than the valve positioning system may allow operators to access the field test initiator without opening the housing of the valve positioning system and/or may allow operators to install the field test initiator on existing valve positioning systems without opening the housing to the valve positioning system. The housing(s) may be weather resistant, explosion resistant and/or proof, and/or meet government and/or industry standards. Positioning the field test initiator, controller, override device, and/or other components in housing(s) may facilitate installation of the fluid regulatory testing system and/or prevent damage to components and/or controllers.

Figure 6:
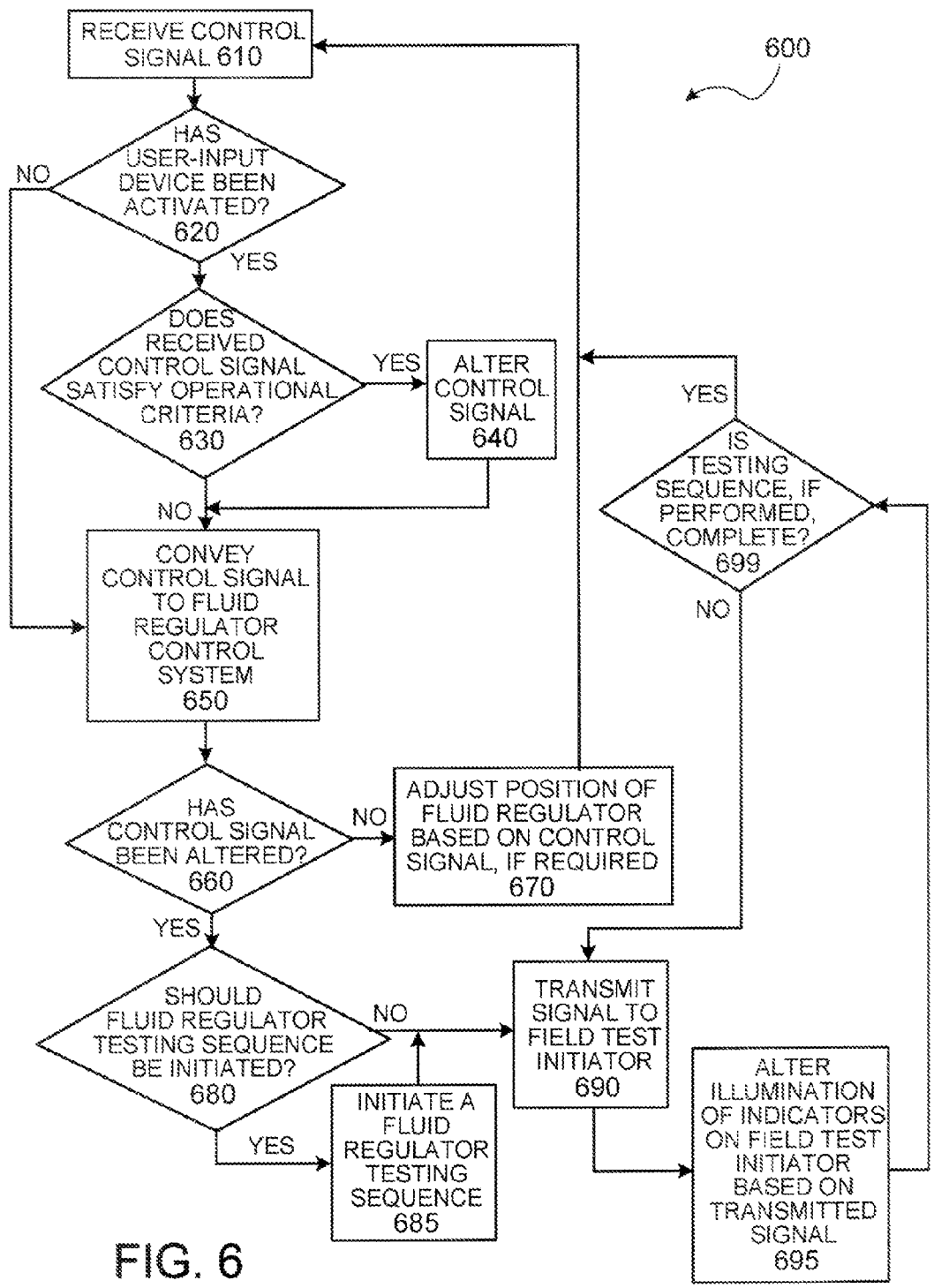
FIG. 6 is a flow chart illustrating an example process performed by a fluid regulatory testing system.

FIG. 6 illustrates an example of a process 600 for fluid regulation. Process 600 may be an example of an operation performed by the system of FIG. 5. Process 600 begins by receiving a control signal (operation 610). For example, a control signal may be transmitted to and received by a field test initiator. The control signal may be, for example, a current or a voltage signal.

A determination may be made whether a user-input device of the field test initiator has been activated (operation 620). For example, whether a user-input device, such as a button, was depressed may be detected. As another example, whether a user-input device, such as a switch, has been pulled may be detected.

A determination may be made whether the control signal satisfies operational criteria (operation 630). The determination may be made by the field test initiator via electrical components or via, for example, a microprocessor or PLD. For example, the field test initiator may include a comparator, such as an op-amp. The op-amp, as previously described, may not alter the control signal if it does not satisfy operational criteria (e.g., within a predetermined range).

For example, operational criteria may indicate, for a 4-20 mA control loop, that when control signal between approximately 2 mA and 5 mA is received, the control signal should not be altered. Inhibiting alteration of a control signal below a predetermined amount or in a predetermined range may inhibit testing while a fluid regulator is in a safe mode position. As another example, operational criteria may indicate, for a 4-20 mA control loop, that when a control signal between approximately 14 mA and approximately 18 mA is received, the control signal should not be altered. Inhibiting alteration of a control signal in a predetermined range (e.g., such as when a central control facility conveys a control signal to initiate a fluid regulator testing sequence), may inhibit the field test initiator from altering the control signal to initiate testing when the central control facility has already initiated testing and/or may inhibit unintentional alteration of the control signal into signal associated with a safe mode position, when testing is requested.

If the control signal satisfies operational criteria, then the control signal may be altered (operation 640). For example, a control signal modifier may alter the control signal by a predetermined amount (e.g., 2-4 mA) or alter the control signal to a predetermined amount (e.g., 16 mA, 4 mA, etc.). The control signal may be altered based on which electrical path the user-input device activates in the control signal modifier. For example, when the user-input device associated with positioning a fluid regulator in a safe mode position (e.g., an emergency shut-down) is activated, an electrical path in the control signal modifier that alters the control signal to a signal associated with positioning the fluid regulator in a safe mode (e.g., 0 mA, 4 mA, 20 mA) may be activated. As another example, when the user-input device associated with initiating a partial stroke test is activated, an electrical path in the control signal modifier may be activated to reduce the control signal to predetermined amount (e.g., 8 mA, 14 mA, 16 mA, 18 mA, etc.) that indicates to the controller of the fluid regulator control system that a fluid regulator testing sequence should be initiated.

The control signal may then be conveyed to the fluid regulator control system (operation 650). For example, the control signal may be conveyed to a controller and/or an override device of the fluid regulator control system.

A determination may be made by the fluid regulator control system whether the control signal has been altered (operation 660). The fluid regulator control system may include electrical components to detect whether the control signal has been altered and/or a controller of the fluid regulator control system may detect whether the control signal has been altered. If the control signal has not been altered, a position of the fluid regulator may be adjusted (e.g., to a safe mode position) based on the control signal, if required (operation 670).

If the control signal has been altered, a determination may be made whether to initiate a fluid regulator testing sequence (operation 680). For example, control signal may be compared to operational criteria (e.g., whether the control signal is above or below a predetermined amount) to determine whether to initiate testing. As an example, in a 4-20 mA current loop, if the altered control signal is greater than 15 mA, a fluid regulator testing sequence may be initiated, while if the altered control signal is less than 15 mA, the fluid regulator may be adjusted to or maintained in a safe position.

Determining whether to initiate a fluid regulator testing sequence may be based on the position of the fluid regulator. For example, if the fluid regulator is in a safe mode position, testing may be inhibited. Testing may be inhibited while a fluid regulator is in a safe mode in order maintain the safe mode operation of the fluid regulatory testing system. As another example, if the fluid regulator is in a closed position, testing may be inhibited. Testing may be inhibited while a fluid regulator is closed to inhibit fowling of the process and/or to maintain current operations.

A fluid regulator testing sequence may be initiated (operation 685). For example, a fluid regulator testing sequence may include adjusting the position of a fluid regulator (e.g., by generating fluid regulator control signals sent to an actuator), monitoring components of the fluid regulator control system and/or the fluid regulator, and/or determining fluid regulator health and/or health of components of the fluid regulatory testing system. Sensors in the fluid regulator control system and the fluid regulator may provide data while monitoring the fluid regulatory testing system.

A signal related to the fluid regulator testing sequence may be sent to the field test initiator (operation 690), and the illumination of the indicators on the field test indicator may be altered based on the received signal related to testing (operation 695). For example, LEDs on the field test initiator may be turned on or off or a color of a light may be changed based on the received signals. The illumination of the indicators may provide information about the fluid regulator testing sequence.

A determination may be made whether the fluid regulator testing sequence has been completed (operation 699). For example, a controller of the fluid regulator control system may determine if the testing sequence, if a determination was made to perform a testing sequence, is being performed or is complete. If the testing sequence is not complete, signals (e.g., related to the progress and/or results of testing) may be transmitted to the field test initiator (operation 690), and the illumination of the indicators on the field test initiator may be altered based on the signals (operation 695). If the testing sequence is complete, then, as new control signals are received, the process may restart (operation 610).

Process 600 may be implemented by system 500 or similar systems. In addition, various operations may be added, deleted, modified, or reordered in process 600. For example, whether the control signal satisfies operational criteria may not be determined (e.g., by the field test initiator and/or the fluid regulator control system), and the control signal may be altered when at least one of the user-input devices is activated. As another example, the field test initiator may alter a control signal when at least one of the user-input devices is activated and the fluid regulator control system may determine whether the altered control signal satisfies operational criteria prior to initiating testing. In addition, a determination whether the control signal has been altered may not be made and a determination of whether to initiate a fluid regulator testing sequence may be based on the control signal received. Furthermore, rather than altering the illumination of the indicators on the field test indicator other properties of the indicators may be changed. For example, an indicator may be auditory and a sound may increase, commence, or end. In addition, a visual indicator may display a new or altered image rather than an illumination of the indicator changing.

Furthermore, since the control signal may be continuously received, the process may be interrupted by a later received control signal. For example, if an emergency shut down signal is received, testing may be terminated. A fluid regulator testing sequence may be interrupted when the control signal fails to satisfy operational criteria (e.g., when the value of the control signal is outside the range that indicates a testing sequence should be performed, the testing sequence may be interrupted).

Figure 7:
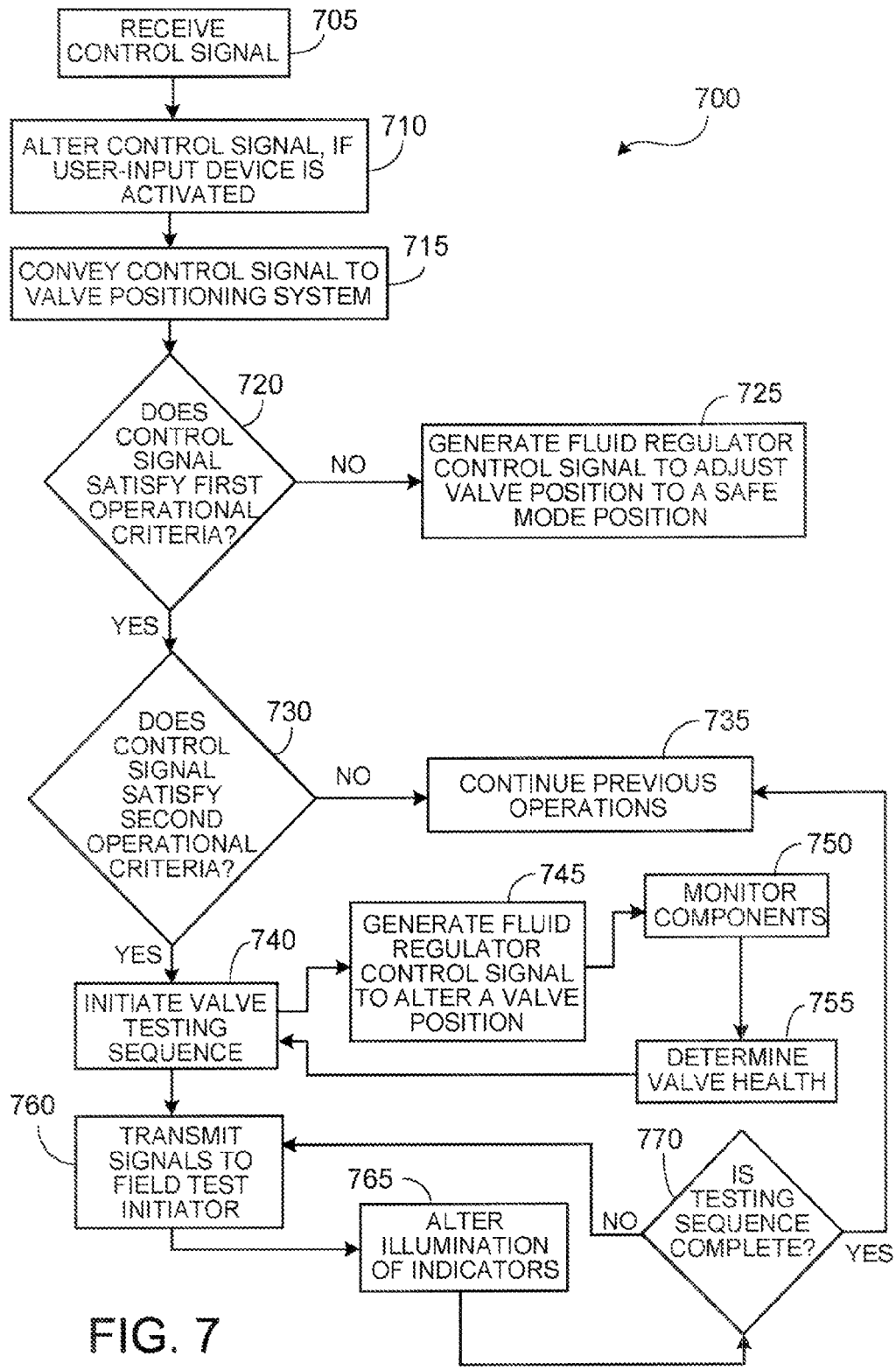
FIG. 7 is a flow chart illustrating another example process performed by a fluid regulatory testing system.

FIG. 7 illustrates another example of a process 700 for fluid regulation. Process 700 begins with receiving a control signal (operation 705). The control signal may be altered if a user-input device has been activated (operation 710). For example, the control signal may be received by the field test initiator and altered by a control signal modifier of the field test initiator, if a user-input device is activated.

The control signal may be conveyed to the valve positioning system (operation 715). For example, the control signal may be transmitted to the valve positioning system via a wire of a two-wire loop.

A determination may be made whether the control signal satisfies first operational criteria (operation 720). First operational criteria may include whether the control signal is greater than a predetermined value. If the control signal does not satisfy the first operational criteria, a fluid regulatory control signal may be generated to adjust a valve position to a safe mode position (operation 725). For example, a safe mode position may vent gasses or inhibit fluid flow, based on the application in which the valve is used. The valve and/or components of the valve positioning system may be monitored and/or a health of the valve may be determined. The illumination of indicators on the field test initiator may be altered based on the determined health of the valve. A valve may be maintained in a safe mode position until a control signal indicating that a position of a valve should be adjusted is received.

A determination may be made whether the control signal satisfies second operational criteria (operation 730). For example, the second operational criteria may include a predetermined range of values (e.g., 15-17 mA). As another example, second operational criteria may include whether the control signal is within a predetermined range for at least a predetermined period of time and/or whether the control signal has been altered for at least a predetermined period of time.

If the control signal does not satisfy the second operational criteria, the previous operations may continue without substantial interruption (operation 735). One feature of the field test initiator may be to inhibit initiating a fluid regulatory testing sequence when a control signal is lower than a predetermined amount, so that testing is not initiated when a valve should be in a safe mode. In addition, second operational criteria may include that if a fluid regulatory testing sequence has been initiated, a new fluid regulatory testing sequence may not be initiated while the previous testing is in progress.

If the control signal satisfies the second operational range, a fluid regulatory testing sequence may be initiated (operation 740). For example, if a control signal is in a predetermined range (e.g., between approximately 15 and approximately 17 mA) and lasts for a predetermined time period (e.g., between approximately 2 and approximately 5 seconds), then a second operational criteria may be satisfied. Operational criteria may include a length of time a predetermined control signal is maintained to prevent minute fluctuations or interruptions from triggering testing or adjusting a valve position to a safe mode position. A fluid regulatory testing sequence may include any testing of a valve to facilitate determination of a valve health and/or identification of problems in a valve and/or valve positioning system.

During the fluid regulatory testing sequence, a fluid regulatory control signal may be generated to alter a position of a valve (operation 745). For example, a valve position may be adjusted by a predetermined amount (e.g., from 100% to 80% open, etc.). Components of the valve positioning system and/or the valve may be monitored (operation 750). For example, sensors in the valve positioning system may transmit data to the controller. Valve positioning system and/or valve health may be determined (operation 755). A controller may analyze the data received from sensors and determine a valve health and/or identify problems in the valve or valve positioning system.

Signals may be transmitted to the field test initiator related to the testing (operation 760) and the illumination of the indicators may be altered based on the received signals (operation 765). For example, an orange LED on the field test initiator may be illuminated when the fluid regulatory testing sequences is initiated. A green LED may indicate that the valve health is good. Illumination of none of the LEDs on the field test initiator may indicate that none of the user-input devices have been activated, and illumination of all the LEDs may indicate an emergency shut down was initiated by the field test initiator. Although LED indicators are described, any appropriate auditory or visual indicator may be used. Use of indicators may provide feedback to operators in the field of the progress and/or results of fluid regulatory testing sequences.

A determination may be made whether the testing sequence is complete (operation 770). If the testing sequence is not complete, signals may be transmitted to the field test initiator (e.g., periodically or continuously) related to the testing sequence (operation 760). In addition, the illumination of the indicators may be altered, as appropriate, based on the signals from (operation 765).

If the testing sequence is completed, then as new control signals are received (operation 710), the process may restart.

Process 700 may be implemented by system 500 or similar systems. In addition, various operations may be added, deleted, modified, or reordered in process 700. For example, the control signal may be evaluated by more than two or less than two operational criteria. As another example, signals related to testing may not be transmitted to the field test initiator. Signals related to testing may be transmitted to the central control facility.

In various implementations, system and processes for fluid regulation may include a latch mode to maintain an operation of the system. A fluid regulator control system in a latch mode may inhibit generation of fluid regulator control signals based on received control signals and/or inhibit alteration of a position of a fluid regulator.

Safety of operations may be increased by latching a fluid regulator control system. For example, when a fluid regulator control system is in a latch mode, a position (e.g., predetermined position, safe mode position, open, closed, partially open, etc.) of a fluid regulator may be transitioned to and/or maintained. As another example, unlatching the fluid regulator control system may require operators to be in the proximity of the fluid regulator control system and/or the fluid regulator to determine whether it is safe to restart the process and therefore, initialize the fluid regulating device (e.g., fluid regulator control system is not longer in a latch mode). Latching a fluid regulator in a safe mode may inhibit accidental interruption of a safe mode and/or interruption of a safe mode due to control signal interruptions and/or fluctuations. Additionally, latching a fluid regulator in a safe mode may inhibit an operator in a central control facility from resuming operations of a valve without observing the valve from the field and/or while other operators are observing the valve in the safe mode. Furthermore, maintaining a position, such as open or closed, such as by commencing a latch mode for a valve positioning system may increase worker safety during shut down and/or maintenance operations.

Figure 8:
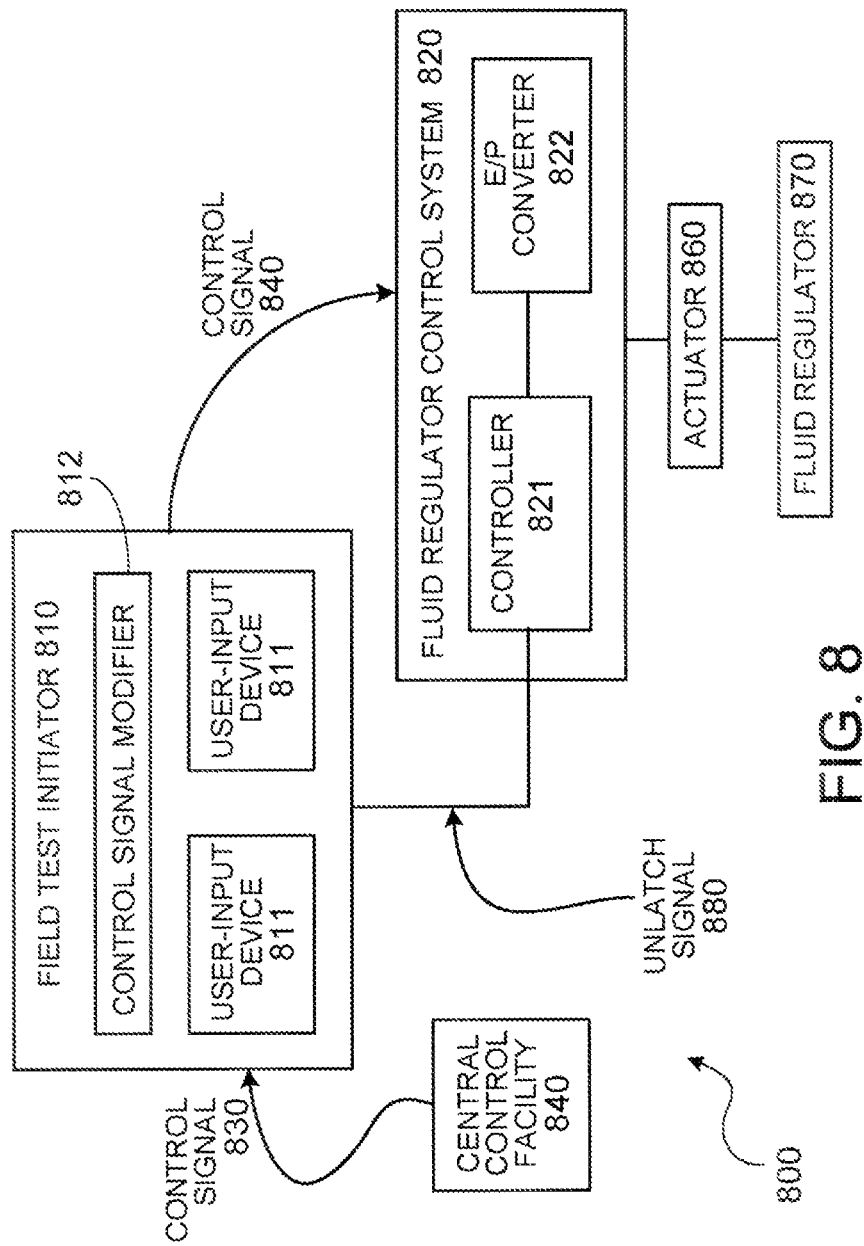
FIG. 8 is a block diagram illustrating an additional example of a fluid regulatory system.

FIG. 8 illustrates an example of a system 800 for fluid regulation. System 800 includes a field test initiator 810 coupled to a fluid regulator control system 820 (e.g., a valve positioning system). Control signals 830 may be conveyed from a central control facility 840 to the fluid regulatory control system 820 via a communication circuit (e.g., a two-wire loop, a four-wire loop, etc.) that includes field test initiator 810.

Fluid regulator control system 820 may include a controller 821 and a E/P converter 822. Control signals 840 received by the fluid regulator control system may be conveyed to the controller 821 (e.g., directly from the field test initiator 810 or central control facility 840 and/or indirectly from an override device). Controller 821 may generate fluid regulator control signals based on the received control signals 840. For example, controller 821 sends signals generated based on control signal 840 to E/P converter 822. E/P converter 822 may convert the electrical signal received from the controller to a pneumatic signal. The pneumatic signal from the E/P converter may be sent (e.g., directly or indirectly though one or more relays) to actuator 860, which operates on a fluid regulator 870 (e.g., safety valves, relief valve, ball valves, etc.).

Fluid regulator control system 820 may have a latch mode. A latch mode may be associated with and/or maintain a position (e.g., predetermined position, previous position, and/or safe mode position) of a fluid regulator. While the fluid regulator control system is in a latch mode, generation of fluid regulator control signals may be inhibited and/or a fluid regulator position may be maintained. For example, controller 821 may not transmit signals to E/P converter 822. As another example, controller 821 may generate fluid regulator control signals as previously generated rather than adjusting the fluid regulator control signals based on the received control signals during latch mode.

A latch mode may be commenced by controller 821. A signal (e.g., electric) may indicate to controller 821 that a latch mode should be commenced. For example, when a control signal is received that indicates a fluid regulator control signal should be generated to position a fluid regulator in a safe mode position and/or when a fluid regulator position is detected as a safe mode position, controller 821 may commence a latch mode.

A latch mode, for example, may be commenced when a trip signal is received by field regulator control system 820. For example, a trip signal may be received by controller 821, and the controller may commence a latch mode in response. The trip signal may be transmitted to field regulator control system 820, for example, via a communication circuit loop of the control signal 830, 840 and/or the wire loop on which the unlatch signal 880 is conveyed. A trip signal may be received by a HART modem of controller 821.

Controller 821 may include a software switch that inhibits generation of fluid regulator control signals until an unlatch signal 880 is detected. Unlatch signals 880 may include interrupts (e.g., voltage interrupts) and/or a short circuit. When the unlatch signal 880 is detected by controller 821 and/or fluid regulator control system 820, the latch mode is removed (e.g., the field regulator control system is no longer in a latch mode).

Unlatch signal 880 may be generated by a user-input device 811 (e.g., field button, switch, etc.) of the field test initiator 810. For example, activation of a user-input device 811 coupled to fluid regulator control system 820 may cause an unlatch signal 880 to be conveyed to the controller 820. Unlatch signal 880 may be conveyed to controller 821 via a different wire loop than the wire loop in which the control signal 830, 840 is conveyed. For example, a 4-20 mA control signal 840 may be conveyed via a two-wire loop to the fluid regulator control system 820 while the unlatch signal 880 may be conveyed to controller 821 of the fluid regulatory system via a separate two-wire loop. As another example, a controller may receive the 4-20 mA control signal via a first wire loop. The controller receives control signal and applies a voltage differential at terminations of a second wire loop (e.g., on a printed circuit board of the controller). Unlatch signal 880 is conveyed on the second wire loop, which may be short circuited (e.g., by activation of a user-input device), to generate unlatch signal 880.

Field test initiator 810 may be similar to the previously described field test initiators in system 100, 500 and/or field test initiators 200, 300. Field test initiator 810 may perform one or more of the processes previously described, such as processes 400, 600, 700. As illustrated, field test initiator 810 may include one or more other user-input devices 811. Activation of one of the other user-input devices may alter the control signal (e.g., by or to a predetermined amount), for example, by activating a portion of a control signal modifier 812. For example, activation of one of the other user-input devices 811 may alter a control signal to indicate to controller 821 that a fluid regulator testing sequence (e.g., partial or full stroke test) should be performed. As another example, activation of one of the other user-input devices 811 may indicate to controller 821 that a fluid regulator 870 should be positioned in a predetermined position, such as a safe mode position (e.g., by generating fluid regulator control signals to position the fluid regulator in the predetermined position; by terminating the generation of fluid regulator control signals, where a fluid regulator is positioned in a predetermined position when no fluid regulator control signals are generated; etc.).

Although field test initiator 810 is illustrated as in a communication circuit, the field test initiator may be separately coupled to fluid regulator control system 820. For example, the field test initiator 810 may not be in the communication circuit between central control facility 840 and a valve positioning system. The field test initiator 810 may, for example, be coupled to a valve positioning system via a separate wire loop (e.g., a one wire loop, a two wire loop, a four wire loop, etc) from the wire loop to and from central control facility 840. In addition, field test initiator 810 may not include a user-input device that when activated, alters a control signal to indicate to a fluid regulator control system that a fluid regulator testing sequence should be commenced.

Although the user-input device 811 is illustrated as disposed on field test initiator 810, the user-input device may not be coupled to the field test initiator. For example, user-input device 811 may be coupled to fluid regulator control system 820 (e.g., disposed on a housing of a valve positioning system and/or coupled to controller 821).

Figure 9:
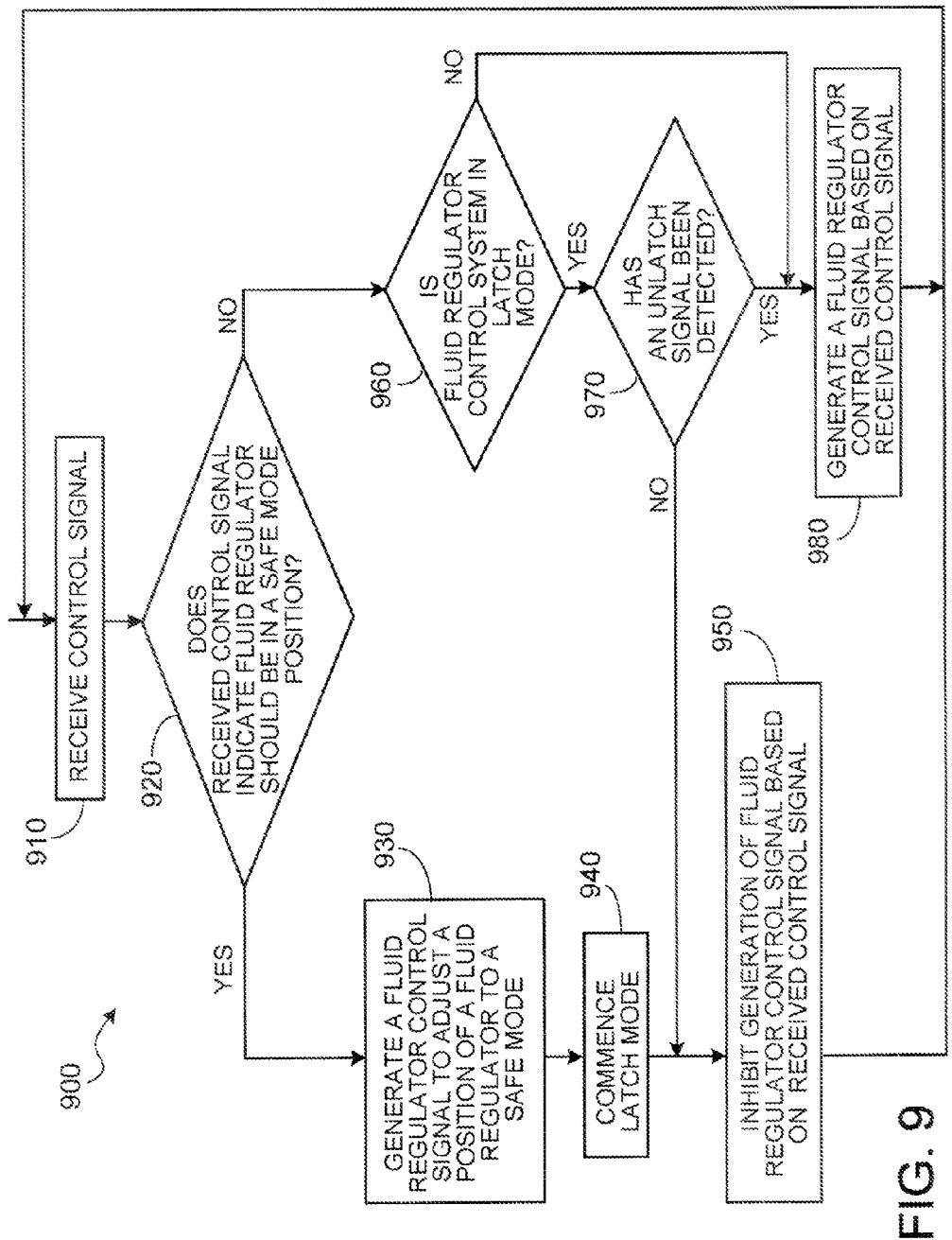
FIG. 9 is a flow chart illustrating an example process performed by a fluid regulatory system.

FIG. 9 illustrates a process 900 for fluid regulation by systems, such as systems 100, 500, 800 illustrated in FIG. 8. Process 900 begins with receiving a control signal (operation 910). For example, a control signal may be received from a field test initiator and/or a central control facility. The control signal may have been altered by the field test initiator, such as when user-input devices are activated. As another example, a control signal may include a trip signal received by the fluid regulator control system. The trip signal may be transmitted (e.g., via control signal wire loop or unlatch signal wire loop) to a controller.

A determination may be made whether the control signal indicates that a fluid regulator should be in a safe mode position (operation 920). For example, a control signal that has been altered (e.g., by the central control facility and/or field test initiator) may satisfy operational criteria, and indicate that a valve should be in a safe mode position. As another example, a control signal with a predetermined value (e.g., 0 mA, 4 mA, or 20 mA) may indicate to the fluid regulator control system that the fluid regulator should be in a safe mode.

If the control signal indicates that the fluid regulator should be in a safe mode position, a fluid regulator control signal may be generated to adjust a position of a fluid regulator to a safe mode position (operation 930). For example, no signal may be generated when a termination of a fluid regulator control signal adjusts a fluid regulator to a safe mode position. As another example, a predetermined control signal may be generated. If the fluid regulator is in a safe mode position, then the safe mode position may be maintained.

The fluid regulator control system may commence a latch mode (operation 940). For example, a controller of a fluid regulator control system may restrict operations in a latch mode (e.g., generation of fluid regulator control signals and/or initiating of fluid regulator testing sequences may be restricted or disallowed; fluid regulator control signals may be generated based on a previous fluid regulator position, a predetermined position, and/or a safe mode position, rather than received control signals; etc.).

Generation of fluid regulator control signals based on the received control signals may be inhibited (operation 950). Thus, alteration of the fluid regulator position (e.g., a safe mode or predetermined position) may be inhibited. For example, fluid regulator control signals may not be transmitted to a override device and/or an E/P converter. The controller of the fluid regulator control system may continue to inhibit generation of fluid regulator control signals based on received control signals, as new control signals are received (operation 910), until an unlatch signal is detected.

If the received control signal does not indicate that a fluid regulator should be in a safe mode position, a determination may be made whether the fluid regulator control system is in a latch mode (e.g., such as when a latch mode was previously commenced in the fluid regulator control system) (operation 960). The latch mode may be determined by the controller.

If the fluid regulator control system is in a latch mode, then a determination may be made whether an unlatch signal has been detected (operation 970). For example, an unlatch signal may be conveyed when a user-input device is activated. The unlatch signal may include short circuiting a wire loop coupled to the controller and/or an interrupt (e.g., voltage interrupt). If the unlatch signal has not been detected, generation of fluid regulator control signals based on the control signals may be inhibited (operation 950).

If an unlatch signal has been detected and/or if the fluid regulator control system is not in a latch mode, a fluid regulator control signal based on the received control signal may be generated (operation 980). For example, the controller may generate fluid regulator control signals based on the control signals to alter a fluid regulator position once the unlatch signal has been detected and/or when the fluid regulator control system is not in a latch mode.

Process 900 may be implemented by system 100, 800, or similar systems. In addition, various operations may be added, deleted, modified, or reordered in process 900. For example, a fluid regulator position may be maintained (e.g., at a previous position or safe mode position) in latch mode. Although the illustrated process describes the latch mode as corresponding to a safe mode, a latch mode may correspond to a predetermined position (e.g., open, closed, or partially open). Thus, a determination of whether a received control signal indicates a fluid regulator should be in the predetermined position may be made; and while the fluid regulator control system is in a latch mode, the predetermined position may be maintained. As another example, a user-input device may be activated to alter a control signal to be received by the fluid regulator control system and the altered signal may indicate that a fluid regulator control signal should be generated that is associated with positioning a fluid regulator in a safe mode position. The controller may generate the fluid regulator control signal associated with positioning a fluid regulator in a safe mode position, in response, commence a latch mode, and maintain the latch mode until an unlatch signal is detected.

The described systems 100, 400, 800 may have several features. A fluid regulatory testing system or valve may be used in safety-implemented systems (e.g., relief valves, rupture disks, and other systems with high reliability standards). The use of fluid regulator control systems (e.g., emergency shut down valves) in safety-implemented systems that are capable of diagnosing problems and/or failures prior to the problem or failure occurring may meet and facilitate compliance with regulations of safety implemented systems (e.g., government, industry, and/or business safety standards). Since emergency shutdown valves are not used in day-to-day operations, testing (e.g., partial stroke testing) is performed periodically (e.g., once a month) to ensure operation and/or reduce the risk of failure of the system. For example, valves may stick after prolonged periods of inactivity. A fluid regulator testing sequence, such as a full stroke test or partial stroke test, may be performed on the fluid regulator to ensure operation and/or reduce the risk of failure. The fluid regulator and/or components of a fluid regulatory testing system may be monitored during the fluid regulator testing sequence. In some full stroke test implementations, using a predetermined signal that corresponds to a signal to position a fluid regulator in a safe mode (e.g., open or closed depending on the application in which the fluid regulator is used), but that allows some power to be provided to the controller (e.g., 4 mA rather than 0 mA in a 4-20 mA control signal loop), may allow monitoring of components to continue during closing. Monitoring the components while testing may provide an indication of the operation and/or the health of the fluid regulatory testing system (e.g., fluid regulator, actuator, and/or fluid regulator control system) during the full open/close operation of a fluid regulator. In addition, monitoring components while closing the fluid regulator may facilitate identification of problems or potential problems with components (e.g., excess friction in valve stem, debris in the actuator, leaks in couplings or lines, etc.). Identification of problems and potential problems may decrease down-time of operations and improve safety.

In addition, to provide for interaction with a user, the field test initiator described here may have a display device (e.g., indicators, LCD (liquid crystal display) panel, etc.) for displaying information to the user and, a keyboard by which the user can provide input to the field test initiator. The user may provide input to the field test initiator using other types of user-input devices, such as touch screens, mice, pointing devices, a stylus, keypads, buttons, switches, etc and/or input from the user may be received in any form, including acoustic, speech, or tactile input. Other kinds of devices can be used to interact with a user as well. For example, feedback provided to the user by an output device may be any form of sensory feedback (e.g., visual feedback, auditory feedback, and/or tactile feedback).

Several implementations for regulating fluid flow have been described, and a number of others have been mentioned or suggested. Furthermore, those skilled in the art will readily recognize that a variety of modifications, substitutions, deletions, and/or additions may be made to these implementations while still achieving fluid control. The scope of the protected subject matter therefore is to be determined on the basis of the following claims, which may encompass one or more aspects of one or more of the implementations.

It is to be understood the implementations are not limited to particular systems or processes described, which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a control signal" includes a combination of two or more control signals and reference to "a diode" includes a combination of different types of diode.

What is claimed is:

1. A method comprising:
   receiving a control signal for a fluid regulator control system at a field test initiator, wherein the control signal is received at an initial value;
   altering the initial value of the control signal by directing the control signal to a control signal modifier at the field test initiator upon detecting activation of at least one user-input device of the field test initiator, wherein the initial value changes according to activation of a first switch and a second switch in response to, respectively, a first user input device and a second user input device on the field test initiator to change the initial value of the control signal to a first value and a second value that correspond to, respectively, the first switch and the second switch, wherein the first value is different from the second value;
   conveying the altered control signal from the field test initiator to the fluid regulator control system;
   determining whether the initial value of the altered control signal satisfies a first operational criteria and a second operational criteria, wherein the first operational criteria includes whether the altered control signal satisfies a pre-determined value, and wherein the second operational criteria includes a pre-determined range of values; and
   generating a fluid regulator control signal,
   wherein, in response to the initial value failing to satisfy the first operational criteria the fluid regulator control signal adjusts a position of a fluid regulator to a safe mode position and latches said fluid regulator control system in the safe mode position to prevent generating of the fluid regulator control signal until initialization of said fluid regulator control system, and wherein, in response to the initial value satisfying the first operational criteria and the second operational criteria, the fluid regulator control signal initiates a fluid regulator testing sequence.

2. The method of claim 1, wherein the second operational criteria further includes whether the value of the altered control signal is within a pre-determined value range for at least a pre-determined period of time.

3. The method of claim 1 wherein initiating a fluid regulator testing sequence comprises:

monitoring one or more components of the fluid regulator control system; and determining a health of the fluid regulator control system based on the monitoring.

4. The method of claim 1 further comprising interrupting a fluid regulator testing sequence when the altered control signal is a pre-determined signal value, wherein the pre-determined signal value corresponds to a signal for positioning a fluid regulator in a safe mode position.

5. The method of claim 1, wherein the first operational criteria includes whether the value of the altered control signal is greater than the pre-determined value.

6. The method of claim 1, wherein in response to the value of the altered control signal failing to satisfy the first operational criteria, the fluid regulator is maintained in the safe mode position until a control signal indicating that the position of the fluid regulator should be adjusted is received.

7. The method of claim 1, wherein the second operational criteria further includes whether the value of the altered control signal has been altered for at least a pre-determined period of time.

* * * * *